United States Patent [19]

Berger

[11] Patent Number: 5,893,578
[45] Date of Patent: Apr. 13, 1999

[54] GAS BAG MODULE FOR A VEHICLE OCCUPANT RESTRAINING SYSTEM

[75] Inventor: Jürgen Berger, Mutlangen, Germany

[73] Assignee: TRW Occupant Restraint Systems GmbH, Alfdorf, Germany

[21] Appl. No.: 08/896,250

[22] Filed: Jul. 17, 1997

[30] Foreign Application Priority Data

Jul. 23, 1996 [DE] Germany ............... 296 12 777 U

[51] Int. Cl.⁶ .................................................. B60R 21/16
[52] U.S. Cl. ................................. 280/728.1; 280/740
[58] Field of Search ........................... 280/736, 738, 280/740, 741, 742

[56] References Cited

U.S. PATENT DOCUMENTS

| | | |
|---|---|---|
| 4,178,017 | 12/1979 | Ishi et al. |
| 4,944,527 | 7/1990 | Bishop et al. ............ 280/741 |
| 5,149,130 | 9/1992 | Wooley et al. |
| 5,286,054 | 2/1994 | Cuevas ............ 280/738 |
| 5,437,472 | 8/1995 | Kuretake et al. ............ 280/740 |
| 5,556,124 | 9/1996 | Olson. |

FOREIGN PATENT DOCUMENTS

| | | |
|---|---|---|
| 4433014 | 3/1995 | Germany. |
| 19602471 | 7/1996 | Germany. |
| 7291080 | 11/1995 | Japan. |

*Primary Examiner*—Paul N. Dickson
*Attorney, Agent, or Firm*—Tarolli, Sundheim, Covell, Tummino & Szabo

[57] ABSTRACT

A gas bag module for a vehicle occupant restraining system comprises a gas generator and a gas bag having an inflation opening formed in a wall of the gas bag and having an interior delimited by the wall. The gas bag is able to be unfolded from a folded state into a deployed state by means of gas under pressure provided by the gas generator and led into the interior of the gas bag through the inflation opening. The gas bag module comprises at least one guard flap arranged in the interior of the gas bag between the inflation opening and a portion of the wall opposite the inflation opening. The at least one guard flap protects the wall of the gas bag against the gas under pressure entering the interior of the gas bag.

7 Claims, 3 Drawing Sheets

GAS BAG MODULE FOR A VEHICLE OCCUPANT RESTRAINING SYSTEM

The invention relates to a gas bag module for a vehicle occupant restraining system.

BACKGROUND OF THE INVENTION

Typical gas bag modules comprise a gas bag which is provided with an inflation opening, through which the interior of the gas bag is able to be charged with a gas under pressure in order to change the gas bag from a folded state into a deployed one.

A significant problem occurring during inflation of a gas bag by gas under pressure from a gas generator is the risk of damage to the gas bag fabric constituting the wall of the gas bag by the impinging gas at an extremely high pressure and at a high temperature as it enters the interior of the gas bag. Conventionally the folded wall of the gas bag is opposite to the inflation opening so that the entering gas under pressure impinges directly on the wall. In order to preclude damage to the wall by the particles contained in the gas under pressure and the heat of the gas, it is possible to utilize a comparatively thick fabric. As an alternative, an additional fabric part can be employed, which is arranged between the inflation opening and the wall of the gas bag opposite thereto so that the gas under pressure may not directly strike the wall of the gas bag.

BRIEF DESCRIPTION OF THE INVENTION

According to the present invention, a gas bag module for a vehicle occupant restraining system is provided, which comprises a gas generator and a gas bag having an inflation opening formed in a wall of the gas bag and having an interior delimited by the wall. The gas bag is able to be unfolded from a folded state into a deployed state by means of gas under pressure provided by the gas generator and led into the interior of the gas bag through the inflation opening. The gas bag module comprises at least one guard flap arranged in the interior of the gas bag between the inflation opening and a portion of the wall opposite the inflation opening. The at least one guard flap protects the wall of the gas bag against the gas under pressure entering the interior of the gas bag. The guard flap provided by the invention protects the wall opposite to the inflation opening of the gas bag against direct impingement by the gas under pressure supplied by the gas generator. Thus it is impossible for there to be any damage to the wall by the gas entering under pressure. Unlike the case of conventional gas bag modules, in which the deployment of the gas bag is initiated by the action of the gas under pressure flowing into it, in the case of the gas bag modules of the invention the deployment of the gas bag is started by the mechanical action of the guard flap as it is opened. Once the guard flap has been slightly opened, the gas under pressure will flow into the gas bag and completely deploy the same. In this respect the guard flap is pivoted into a position in which it is no longer opposite to the inflation opening. Accordingly there is a flow free of losses of the gas under pressure into the interior of the gas bag without there being any damage to the gas bag wall, which at this point in time is already at a safe distance from the inflation opening. Since the load on the gas bag fabric is comparatively low owing to the guard flap, it is to employ a thinner and consequently cheaper fabric which only has to be customized to take into account the restraining action and no longer as regards the possible damage by the gas entering under pressure. Owing to the employment of a guard flap there is the further advantage that at the start of the deployment process the gas under pressure entering the interior of the gas bag is evenly distributed on the side of the guard flap which is opposite to the gas generator, before the gas bag deploys and the guard flap is folded open. This is more especially an advantage with gas bag modules whose inflation opening is arranged asymmetrically in relation to the gas bag so that the process of deployment takes place asymmetrically, if no special precautions are taken.

In accordance with a preferred embodiment of the invention, a trough-like holding part is provided which is arranged in the interior of the gas bag. The holding part has a bottom which is arranged on a portion of the wall surrounding the inflation opening, and is provided with a passage coinciding with the inflation opening. The holding part further possesses two mutually opposite side parts, at least one of the side parts being provided with the guard flap. Together with the guard flap, the trough-like holding part constitutes a channel connected with the inflation opening, into which at the beginning of the deployment process the gas under pressure supplied by the gas generator will flow. Once a certain amount of gas under pressure has flowed into the channel, the deployment operation for the gas bag is commenced simultaneously with the opening of at least one guard flap. Even if the gas under pressure flows in at, for example, an axial end into the channel, prior to the start of the deployment process there will be an even distribution of the gas under pressure in the channel so that the deployment operation is evenly started. The bottom of the holding part protects the wall surrounding the inflation opening of the gas bag against damage by the gas entering under pressure.

Preferably, the mutually opposite side parts have free edges, and two of the guard flaps are provided, the guard flaps being respectively arranged on the free edges of the mutually opposite side parts. In the case of the employment of two guard flaps, each individual guard flap may be made smaller so that same is easier to open.

Preferably it is provided that the gas bag constitutes a pre-assembled unit together with the holding part. For this purpose, the wall of the gas bag can be folded on a side of the guard flap or, respectively, the guard flaps, which faces away from the inflation opening. Further, the folded gas bag may be held in position, for example by means of a foil able to be ruptured. In addition to its function as an attachment element for the guard flaps the holding part has the further function of the attachment frame, which in the case of conventional gas bags is arranged in the interior thereof and serves for connection of the gas bag with a gas generator or on the housing thereof.

Further advantageous developments of the invention are defined in the dependent claims.

BRIEF DESCRIPTION OF THE DRAWINGS

The invention will now be described with reference to a preferred embodiment, which is illustrated in the drawings.

DETAILED DESCRIPTION OF THE DRAWINGS

Figure 1:
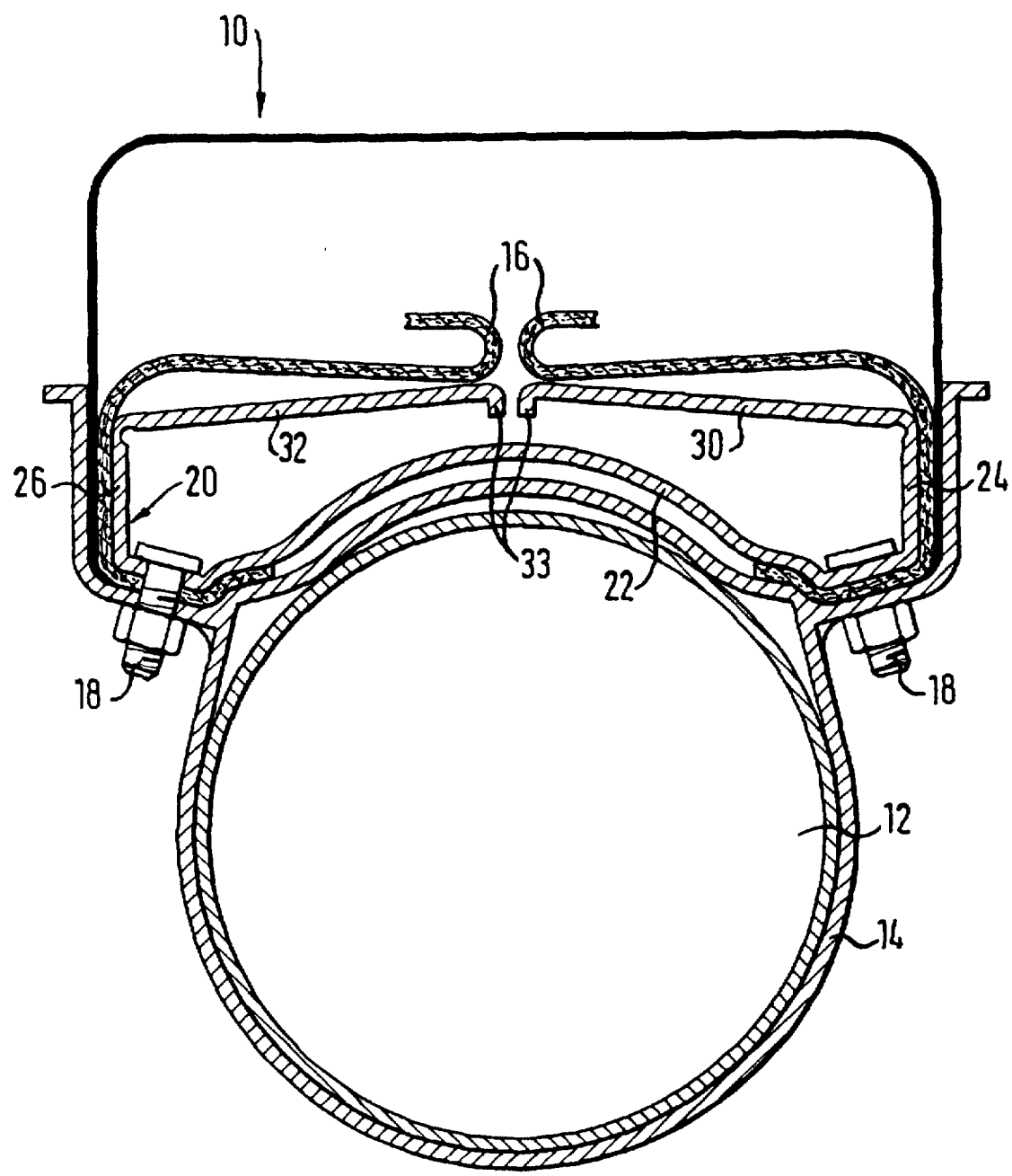
FIG. 1 shows a cross section taken through a gas bag module of the invention.

In FIG. 1 a diagrammatic cross section of a gas bag module 10 in accordance with the invention for a vehicle occupant restraining system will be seen. This gas bag module 10 has as its main part a gas bag 16, which is provided with a holding part 20. The gas bag module 10 is connected (by bolts 18) with a housing 14, in which a source 12 of gas under pressure is arranged. Instead of the bolts it is also possible to utilize rivets or self-tapping screws. The use of clips is also possible. The housing 14 is connected with an inflation opening (not visible in this section) of the gas bag 16 in order to charge the interior of the gas bag 16 with gas under pressure on ignition of the gas Generator 14.

Figure 2:
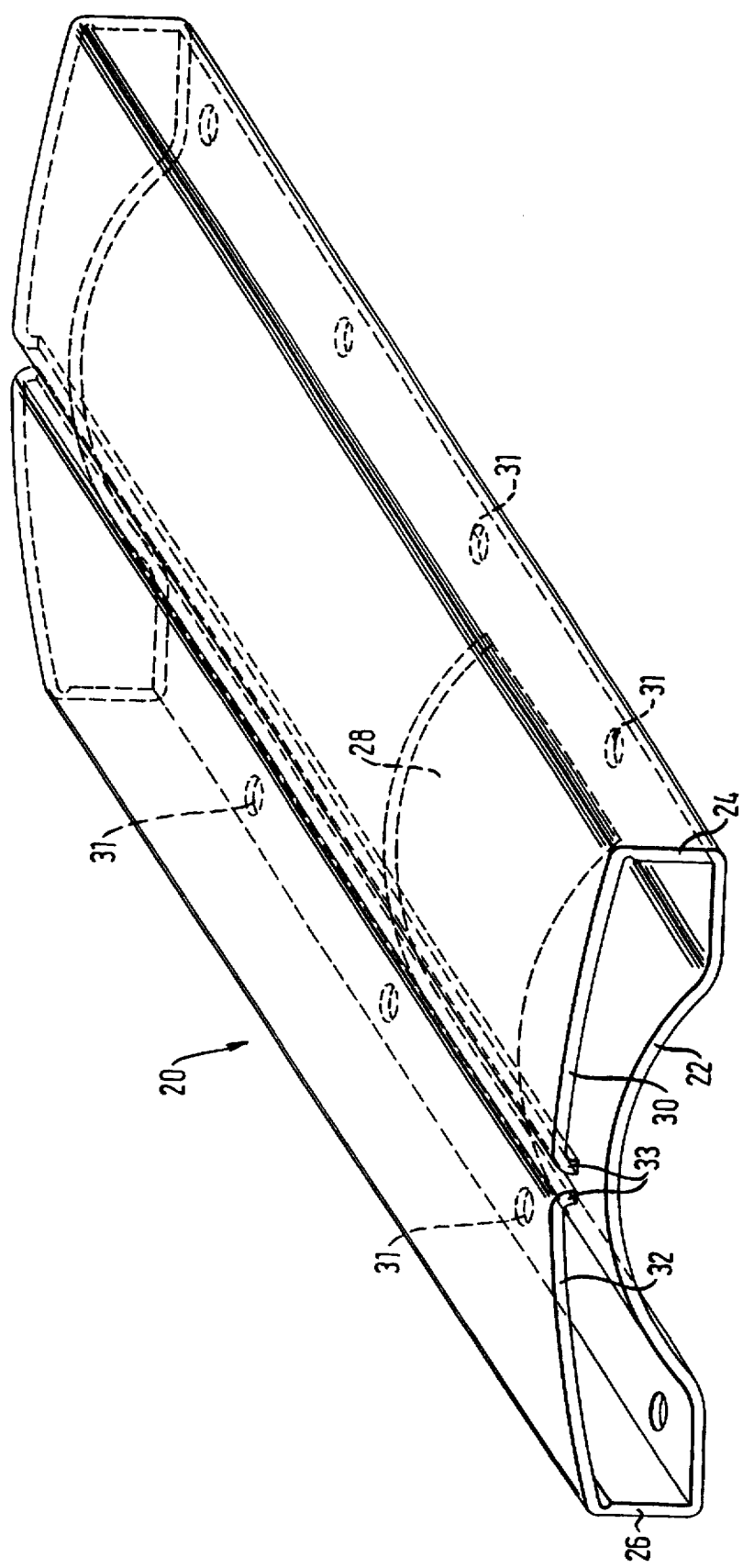
FIG. 2 diagrammatically shows a perspective view of the holding part utilized in the gas bag module of FIG. 1.

The holding part 20 arranged in the interior of the gas bag 16 has a trough-like, elongated configuration (see also FIG. 2) and has a bottom 22 and two side parts 24 and 26. The bottom 22 is provided with a passage 28, which coincides with the inflation opening of the gas bag 16, when the gas bag 10 is completely mounted in place. On the two side parts 24 and 26 of the holding part 20, a respective guard flap 30 and, respectively, 32 is mounted so that a channel for the flow of gas under pressure from the inflation opening 28 into the interior of the gas bag 16 if formed between the two guard flaps 30 and 32, the two side parts 24 and 26 and the bottom 22. The holding part 20 may be manufactured of synthetic resin or another suitable material while the guard flaps 30 and 32 are integrally molded on the side parts. It is also possible to produce the guard flaps as separate parts which are then later joined to the holding part. On the free, mutually opposite sides, the guard flaps 30 and 32 are provided with a bent-over edge 33 so that no sharp edge can be produced, which might damage the gas bag 16.

Together with the gas bag 16 the holding part 20 may be pre-assembled as a unit. For this purpose screw bolts 18 are inserted into openings 31, which are formed in the bottom 22 of the holding part 20. Together with these screw bolts the holding part 20 is inserted into the interior of the gas bag 16 so that the screw bolts 18 extend right through passage openings formed in the wall of the gas bag, and the gas bag 16 is fixed in relation to the holding part 20. Then the gas bag 16 is folded onto the guard flaps 30 and 32 and secured in place, for example by means of a piece of foil, so that a pre-assembled unit is formed which may be secured to the housing 14 of the gas bag module 10.

Figure 3:
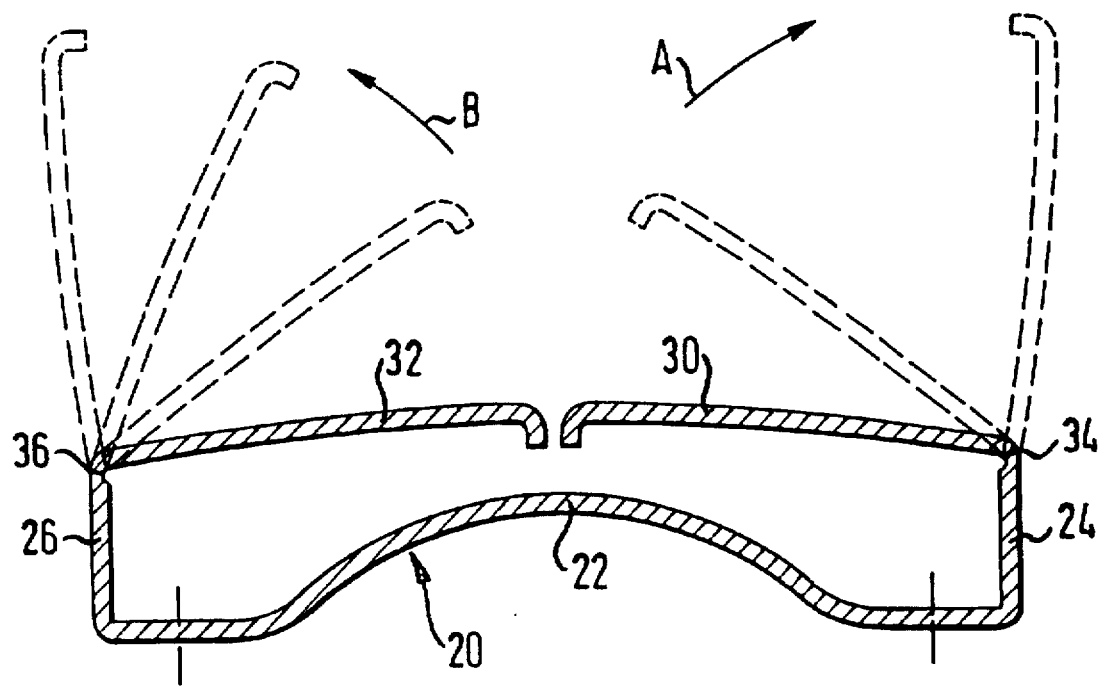
FIG. 3 is a diagrammatic cross section taken through the holding part depicted in FIG. 2, different settings of the guard flaps being represented.

Referring now more particularly to FIG. 3, the function of the holding part 20 and of the guard flaps 30 and 32 will now be explained with reference to FIG. 3 during deployment of the gas bag 16. After activation of the gas generator 12, the gas under pressure supplied by it will flow via the inflation opening and the passage 28 of the holding part 20 into the channel, which is defined by the guard flaps 30 and 32 and by the holding part 20. During this first period following triggering of the gas generator 12 there will be an even distribution of the gas under pressure in the interior of channel, although the inflation opening is arranged eccentrically in the channel.

Once a certain pressure has been reached in the interior of channel, the guard flaps 30 and 32 are opened, the wall of the gas bag 16 folded onto the guard flap 30 and 32 being thrust away from the gas generator 12. There now begins the actual deployment process for the gas bag. In FIG. 3 various different intermediate stages in opening of the guard flaps 30 and 32 are indicated in broken lines, folding of the flaps taking place in the directions A and, respectively, B until a fully open position is reached, in which the gas under pressure supplied by the gas generator 12 may freely flow into the interior of the gas bag 16. The guard flaps 30 and 32 are designed to be integral with the side parts 24 and 26, pivoting movement being facilitated by a hinge region 34 and, respectively, 36, which is made with a reduced wall thickness.

Figure 4:
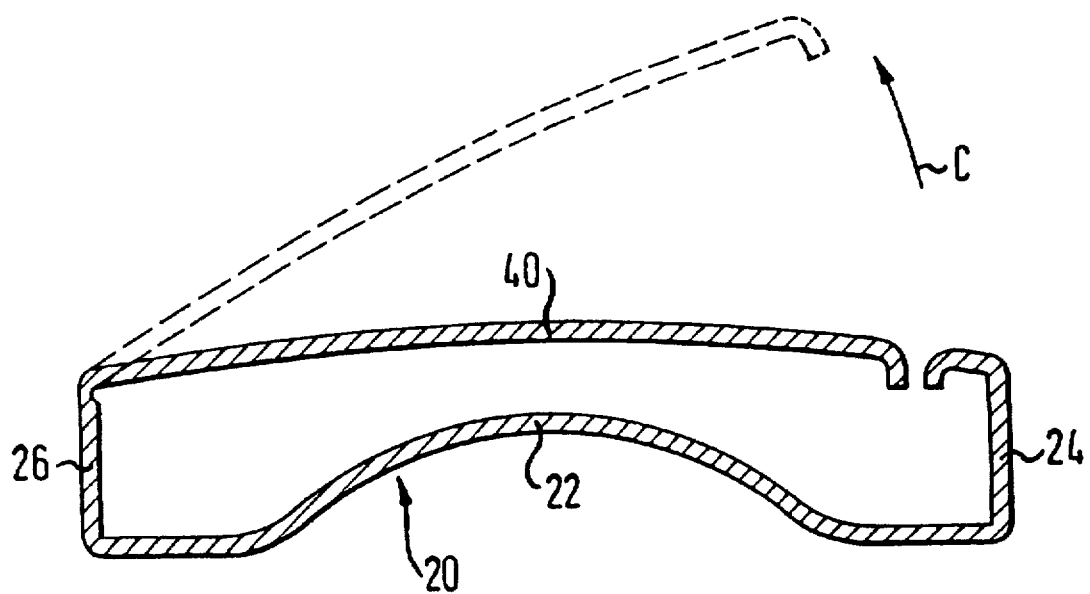
FIG. 4 shows a possible modification of the holding part of FIG. 3.

In FIG. 4 a modification of the holding part 20 of FIG. 3 is illustrated. Instead of having two guard flaps 30 and 32, a single guard flap 40 is utilized, which is secured to the side part 26. The guard flap 40 is pivoted into the completely open position in the direction of the arrow C after triggering the gas generator 12. Owing to the use of only one pivoting flap it is possible, more particularly, to affect the direction of deployment of the gas bag 16.

I claim:

1. A gas bag module for a vehicle occupant restraining system, comprising a gas generator and a gas bag having an inflation opening formed in a wall of said gas bag and having an interior delimited by said wall, said gas bag being able to be unfolded from a folded state into a deployed state by means of gas under pressure provided by said gas generator and led into said interior of said gas bag through said inflation opening, said gas bag module comprising at least one guard flap arranged in said interior of said gas bag between said inflation opening and a portion of said wall opposite said inflation opening, said at least one guard flap protecting said wall of said gas bag against said gas under pressure entering said interior of said gas bag, a holding part being arranged in said interior of said gas bag, said holding part having the shape of a trough with a bottom and two mutually opposite side parts, said bottom being arranged on a portion of said wall which surrounds said inflation opening and being provided with a passage coinciding with said inflation opening, at least one of said side parts being provided with said guard flap.

2. The gas bag module of claim 1, wherein said mutually opposite side parts have free edges and wherein two of said guard flaps are provided, said guard flaps being respectively arranged on said free edges of said mutually opposite side parts.

3. The gas bag module of claim 1, wherein said wall of said gas bag is folded on a side of said guard flap which faces away from said inflation opening.

4. The gas bag module of claim 3, wherein said bottom of said holding part is provided with outwardly projecting screw bolts which extend through openings formed in said wall of said gas bag.

5. The gas bag module of claim 4, wherein said gas bag constitutes a pre-assembled unit together with said holding part.

6. A gas bag module for a vehicle occupant restraining system, comprising a gas generator and a gas bag having an inflation opening formed in a wall of said gas bag and having an interior delimited by said wall, said gas bag being able to be unfolded from a folded state into a deployed state by means of gas under pressure provided by said gas generator and led into said interior of said gas bag through said inflation opening, said gas bag module comprising at least one guard flap arranged in said interior of said gas bag between said inflation opening and a portion of said wall opposite said inflation opening, said at least one guard flap protecting said wall of said gas bag against said gas under pressure entering said interior of said gas bag, a holding part being arranged in said interior of said gas bag, said holding part having the shape of a trough with a bottom and two mutually opposite side parts, said bottom being arranged on a portion of said wall which surrounds said inflation opening and being provided with a passage coinciding with said inflation opening, at least one of said side parts being provided with said guard flap, each of said guard flaps being formed integrally with said holding part by means of a hinge region of a corresponding one of said side parts, said hinge having a reduced wall thickness.

7. A gas bag module for a vehicle occupant restraining system, comprising a gas generator and a gas bag having an inflation opening formed in a wall of said gas bag and having an interior delimited by said wall, said gas bag being able to be unfolded from a folded state into a deployed state by means of gas under pressure provided by said gas generator and led into said interior of said gas bag through said inflation opening, said gas bag module comprising at least one guard flap arranged in said interior of said gas bag between said inflation opening and a portion of said wall opposite said inflation opening, said at least one guard flap protecting said wall of said gas bag against said gas under pressure entering said interior of said gas bag, a holding part being arranged in said interior of said gas bag, said holding part having the shape of a trough with a bottom and two mutually opposite side parts, said bottom being arranged on a portion of said wall which surrounds said inflation opening and being provided with a passage coinciding with said inflation opening, at least one of said side parts being provided with said guard flap, said mutually opposite side parts having free edges and wherein two of said guard flaps are provided, said guard flaps being respectively arranged on said free edges of said mutually opposite side parts, each of said guard flaps being formed integrally with said holding part by means of a hinge region of a corresponding one of said side parts, said hinge region having a reduced wall thickness.

\* \* \* \* \*